United States Patent [19]

Snyder

[11] Patent Number: 5,768,371
[45] Date of Patent: Jun. 16, 1998

US005768371A

[54] BELT HOLDER WITH AUXILIARY BATTERY

[75] Inventor: Thomas D. Snyder, Raleigh, N.C.

[73] Assignee: Ericsson Inc., Research Triangle Park, N.C.

[21] Appl. No.: 738,780

[22] Filed: Oct. 29, 1996

[51] Int. Cl.⁶ ..................................... H04M 1/00

[52] U.S. Cl. .................. 379/446; 379/455; 379/454

[58] Field of Search ..................... 379/446, 455, 379/454, 449, 426; 455/90, 575, 348, 349; 224/929, 930

[56] References Cited

U.S. PATENT DOCUMENTS

| 5,189,358 | 2/1993 | Tomura et al. | 455/575 |
| 5,353,017 | 10/1994 | Suzuki et al. | 455/348 |
| 5,535,434 | 7/1996 | Siddoway et al. | 455/349 |

*Primary Examiner*—Jack Chiang
*Attorney, Agent, or Firm*—Jenkens & Gilchrist

[57] ABSTRACT

An electronic device holder for increasing the standby and talk time of a cellular telephone is disclosed. The apparatus includes a housing defining a cradle for holding the cellular telephone. A battery is integrated within the housing such that when a cellular telephone is placed within the cradle, the battery within the housing powers the telephone rather than the main battery located within the cellular telephone unit.

3 Claims, 6 Drawing Sheets

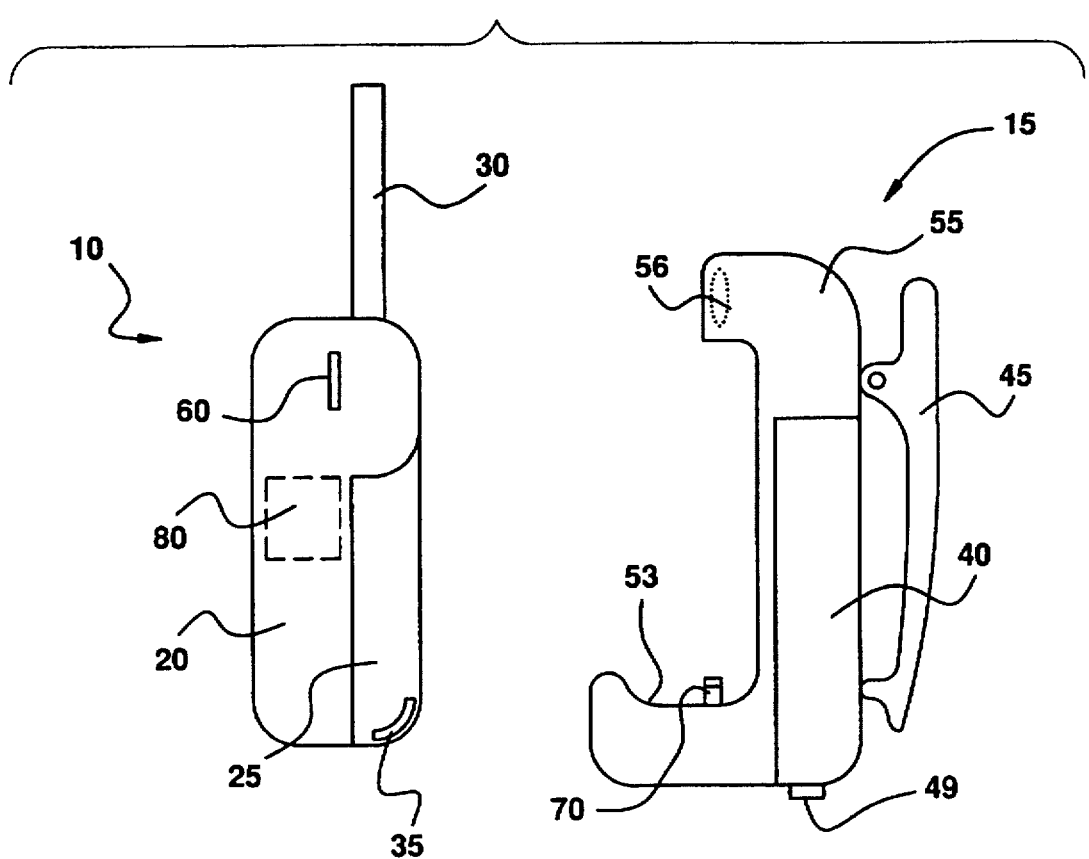
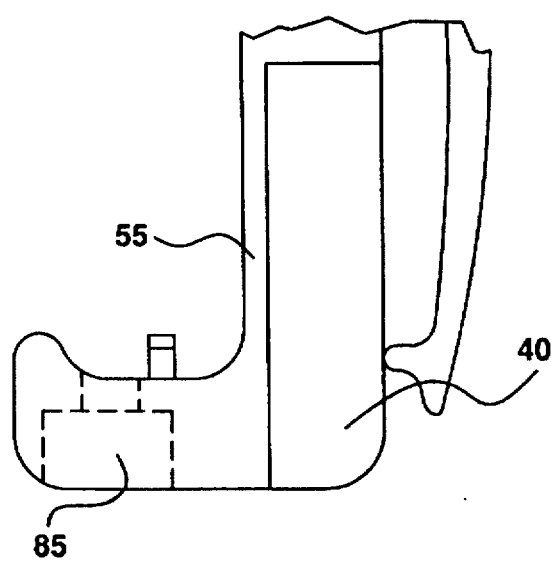

BELT HOLDER WITH AUXILIARY BATTERY

BACKGROUND OF THE INVENTION

1. Technical Field of the Invention

The present invention relates to apparatus for extending the standby time for portable cellular telephone units, and more particularly, to holders for cellular telephone units incorporating an auxiliary battery within the holder.

2. Description of Related Art

The battery pack is the main power source for portable electronic devices such as cellular phones. The portable nature of cellular phones are limited by the fact that their battery power will not last forever. After a period of time the batteries become discharged and the cellular phone must be plugged into a charger in order to recharge the battery. In order to achieve more battery power (longer battery life), typically the size of the battery cell must be increased. This presents a problem for cellular telephone designers due to the conflicts between a desire for longer talk time and standby for the phone (i.e., longer battery life) and the desire for smaller, lighter telephones.

Existing solutions for the problems of shortened talk time and standby have been limited to the development of high capacity batteries for cellular telephone units. These batteries suffer from the limitations of size and weight mentioned previously. The conflict between size and power is made worse by the development of next generation telephones which are becoming smaller and smaller. Other solutions involve the use of improved battery technologies that increase the charge per volume and charge per weight ratios of existing battery systems. However, these improvements have not been sufficient to keep up with the smaller sizes of cellular telephone units that are possible using existing components and technologies. Thus, what is necessary for meeting the presently existing market needs is a means for increasing a cellular telephone's battery life while at the same time leaving the size and weight of the cellular telephone unchanged.

SUMMARY OF THE INVENTION

The present invention overcomes the foregoing and other problems with a cellular telephone belt holder enabling longer standby and talk times without increasing the weight of a hand-held cellular telephone unit. The device includes a housing defining a cradle for receiving a cellular telephone unit. A battery is incorporated within the housing such that the housing and battery can be clipped to the belt of a user. The battery may be permanently integrated within the housing or removable such that once the battery has discharged it may be removed and a new battery inserted within the housing. If the battery is integrated with the housing a means for recharging the battery may be included.

The housing includes a means for interconnecting the power circuitry of a cellular telephone unit to the battery. The means for interconnecting operates such that when a cellular telephone unit is placed within the cradle of the housing, the power circuitry of the cellular telephone unit is switched from operating on the internal battery of the cellular telephone unit to the battery located within the housing of the belt holder. This enables the charge within the internal battery to be conserved. The housing may further include locking means such as a rib and slot configuration for snapping the telephone into a secure position within the housing. The tension in this connection would be limited such that the phone would be easily removable by the user. Since the internal battery is only in use when the auxiliary battery is discharged or when the phone is in use, an increase in battery life is achieved without a corresponding increase in telephone size.

BRIEF DESCRIPTION OF THE DRAWINGS

For a more complete understanding of the present invention, reference is made to the following detailed description taken in conjunction with the accompanying drawings wherein:

FIG. 1 is a side view of a cellular telephone and a telephone holder incorporating an auxiliary battery;

FIG. 2 is an alternative embodiment of the invention disclosed in FIG. 1 wherein the holder includes an opening for the attachment of additional devices;

DETAILED DESCRIPTION OF THE DRAWINGS

Figure 3:
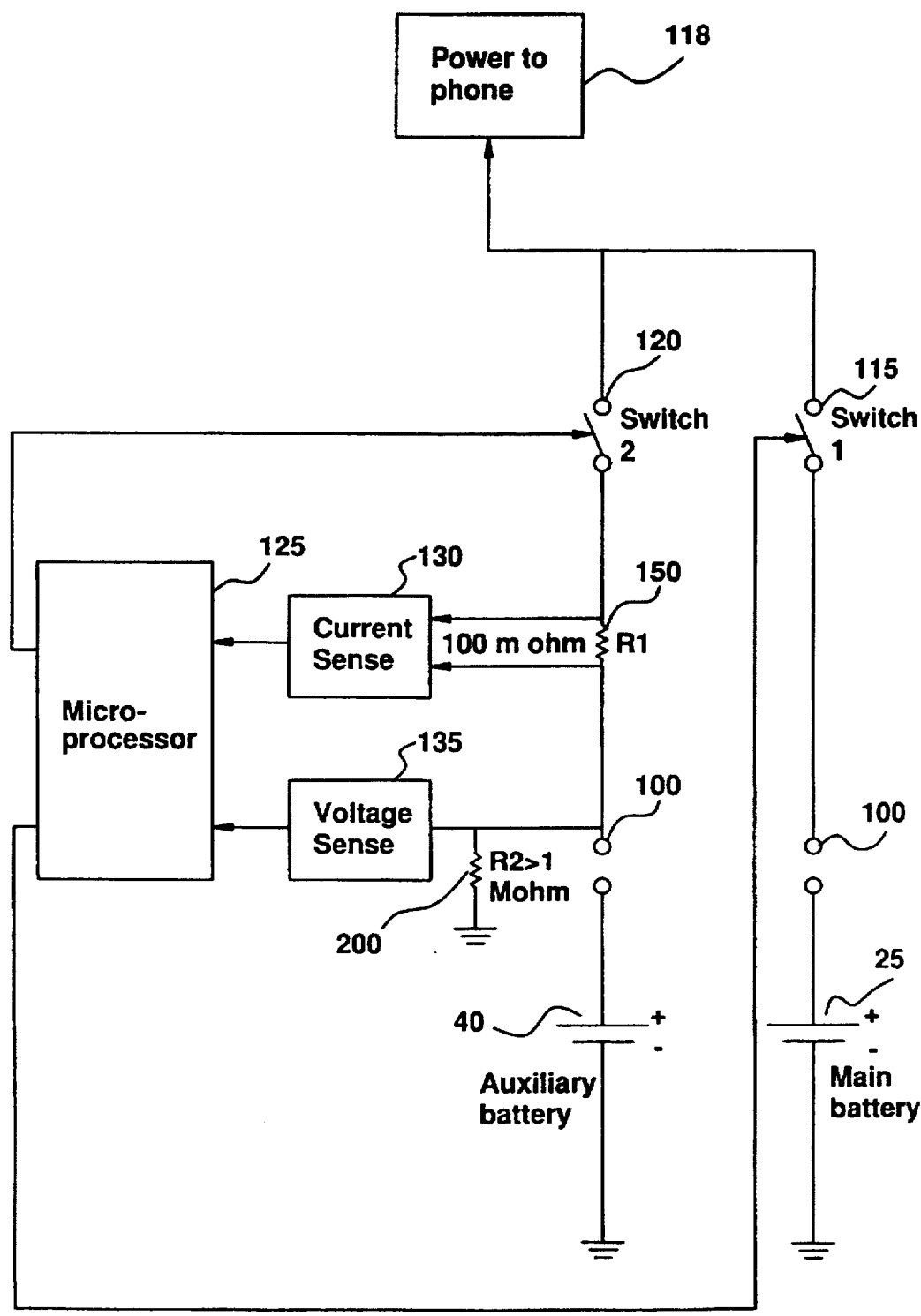
FIG. 3 is a block diagram illustrating the circuitry for switching battery power between the auxiliary battery and the main battery when a cellular telephone is placed in the telephone holder.

Referring now to the Drawings, and more particularly to FIG. 1, there is illustrated a side view of a cellular telephone holder 15 incorporating an auxiliary battery and an associated cellular telephone unit 10. The cellular telephone unit 10 includes the main housing 20, a battery 25 and antenna 30. Contact 35 at the base of the cellular telephone provides a connection to the power circuitry of the cellular telephone unit 10. The circuitry interconnected with the contact 35 will be more fully discussed in a moment. While the present description illustrates the contact being placed at the base of the cellular telephone unit 10, the contact may of course be located at any point enabling interconnection of the cellular telephone unit 10 with the auxiliary battery 40 of the telephone holder 15.

The cellular telephone holder 15 includes the auxiliary battery 40 integrally connected with a housing 55. The holder housing 55 is designed such that it is integrated with auxiliary battery 40 as a single piece or such that the auxiliary battery may be removably connected to the holder housing by sliding, snapping or some other type of connection means. The cellular telephone holder 15 may also include a charger connection 49 for connecting a battery recharger.

The housing 55 defines a cradle 53 for holding the cellular telephone unit 10. A holding rib 56 in the housing 55 may be positioned to lockably engage a corresponding slot 60 within the housing 20 of the cellular telephone unit 10. The rib 56 and slot 60 combination secure the telephone unit 10 within the cradle 53 while still enabling removal of the telephone unit from the telephone holder 15. A clip 45 for enabling a user to attach the cellular telephone holder 10 to some portion of their clothing, most likely their belt, is connected to the back of the holder housing 55. This enables the weight of the auxiliary battery 40 to be more conveniently carried in a place other than the telephone unit 15.

The cradle 53 for the cellular telephone unit 10 further includes a contact 70 for engaging the contact 35 of the portable telephone unit 10. The contact 70 interconnects the positive and negative terminals of the auxiliary battery 40 to the portable telephone unit 10. Internal to the portable telephone unit 10 is auxiliary battery sensor circuitry 80 for switching system power between the main 25 and the auxiliary 40 batteries. Switching between the batteries is responsive to changes in current initiated by placement or removal of the telephone unit 10 from the housing 55. The sensor 80 also switches power back to the main battery 25 should the charge of the auxiliary battery 40 become depleted. The preferred embodiment of the sensor circuitry 80 will be more fully discussed with respect to FIGS. 3–5.

Referring now to FIG. 2 there is illustrated a side view of an alternative embodiment of the cellular telephone holder 55 wherein there is included within the cradle, an opening 85 enabling the attachment of peripheral devices to the telephone unit 10. Through this opening 85 data accessories, chargers, and/or alternative telephone connections may be connected to the telephone unit 10.

It should be realized that while FIGS. 1–2 have been described with respect to the use of a cellular telephone and cellular telephone holder, the use of the electronic holding device having an integrated auxiliary battery would be equally applicable to any electronic device having a standby mode and an internal battery or a need to increase battery life.

Referring now to FIG. 3, there is illustrated the auxiliary battery sensor circuitry 80 for detecting the connection of a auxiliary battery 40 to the cellular telephone unit 10. The sensor circuitry 80 includes a pair of connections 100 for interconnecting the main battery 25 and auxiliary battery 40 to the power circuitry of the telephone unit 10. A pair of switches 115 and 120 interconnect the main 25 and auxiliary 40 batteries to the remainder of the telephone power circuitry 118. The switches 120 and 115 are controlled by a microprocessor 125 in response to control signals received from a current sensor 130 and a voltage sensor 135.

Figure 4:
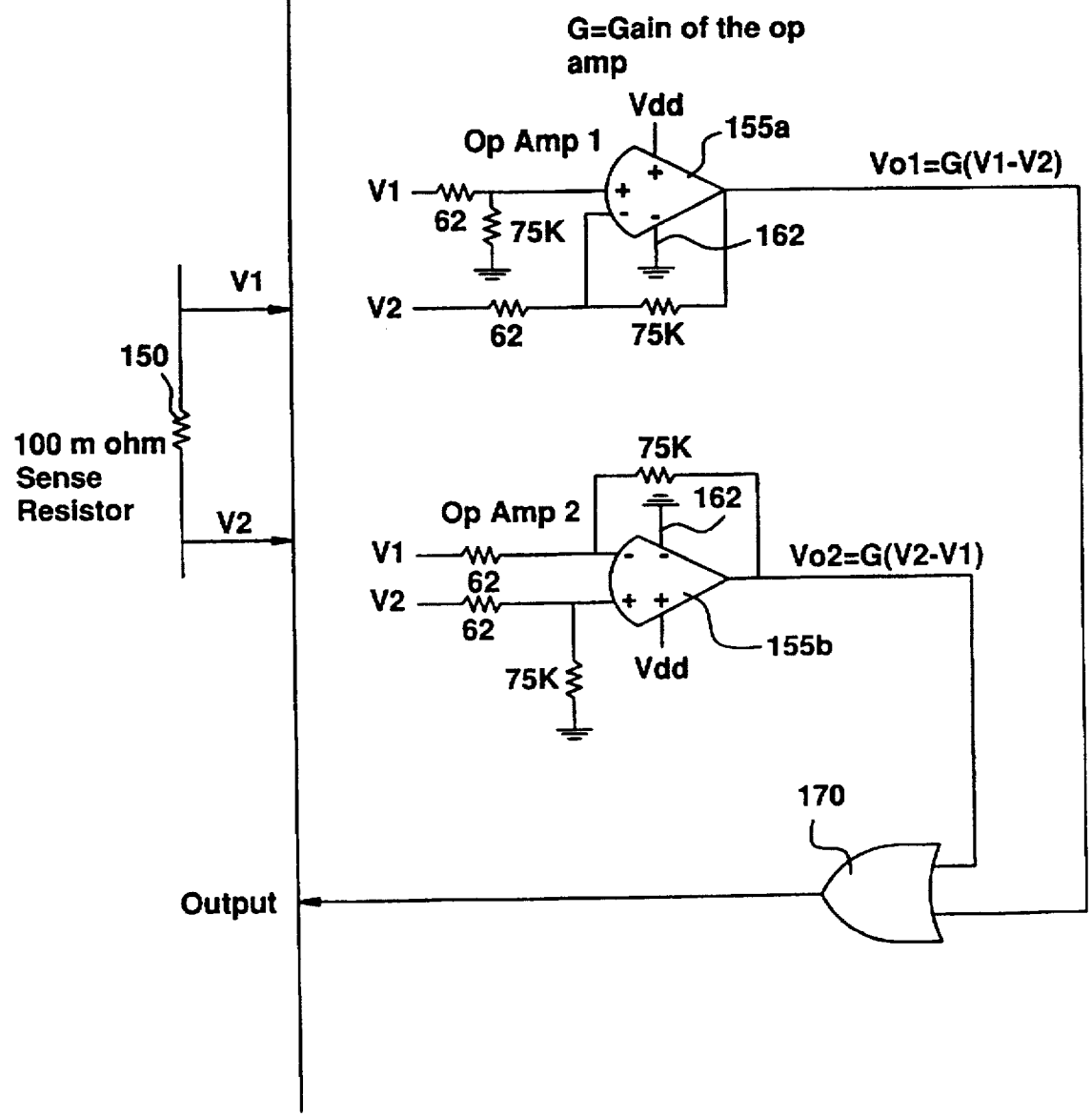
FIG. 4 is a circuit diagram of the current sensor block of FIG. 3.

The current sensor 130 detects current passing through a resistor 150. Current flow through the resistor 150 is initiated by connection of the auxiliary battery 40 to the portable telephone unit 10. Referring now also to FIG. 4 wherein there is illustrated the circuitry of the current sensor 130. Voltage readings ($V_1$ and $V_2$) are taken from each end of the resistor 150 and applied to the inputs of a pair of operational amplifiers 155. The voltage $V_1$ is connected to the positive input of operational amplifier 155a while voltage $V_2$ is connected to the negative input. The inputs of the operational amplifier 155b are connected to the voltages in the opposite manner. The operational amplifiers 155 amplify the difference in voltage across the resistor 155. Since a negative supply voltage is not available within the portable telephone unit 10, each operational amplifier 155 has its negative supply 162 grounded and cannot supply a negative voltage. Consequently, two operational amplifiers 155 are needed to amplify the differential voltage for each direction of current flow.

The voltage differential output of each operational amplifier 155 is provided to the inputs of an OR gate 170. If either the first or second operational amplifier 155 generates a high voltage, indicating current is flowing through the sensor resistor 150, the OR gate 170 outputs a logical high voltage signal. This is interpreted by the microprocessor 125 as connection of a auxiliary battery and switch 120 is closed while switch 115 is opened to preserve power to the main battery 25. When the output of both the first and second operational amplifiers 155 are low, OR gate 170 generates a logical low voltage signal, and switch 115 is closed to provide power from the main battery 25. Switch 120 also remains closed to enable current flow to occur through resistor 150 once an auxiliary battery 40 is connected.

Referring back to FIG. 3, the voltage sensor 135 determines the voltage output of a connected auxiliary battery 40 and generates a voltage signal indicating whether sufficient voltage exists to power the cellular telephone unit 10. Sufficient voltage is based upon whether the auxiliary battery 40 can supply a pre-selected threshold voltage. When the auxiliary battery voltage falls below the predetermined threshold, a signal is generated indicating this to the microprocessor 125. Switch 120 then opens to disconnect the auxiliary battery 40 from the power circuitry 118, and switch 115 closes to connect the main battery 25. With switch 120 open resistor 150 can no longer detect connection of the auxiliary battery 40. Therefore, a resistor 200 enables detection of a physical connection of the auxiliary battery 40 to connection 100. When the auxiliary battery 40 engages connector 100, the voltage across resistor 200 will be positive. Once the auxiliary battery 40 is disconnected, the voltage across resistor 200 goes to zero. The voltage across resistor 200 is monitored by the voltage sensor 135.

Figure 5:
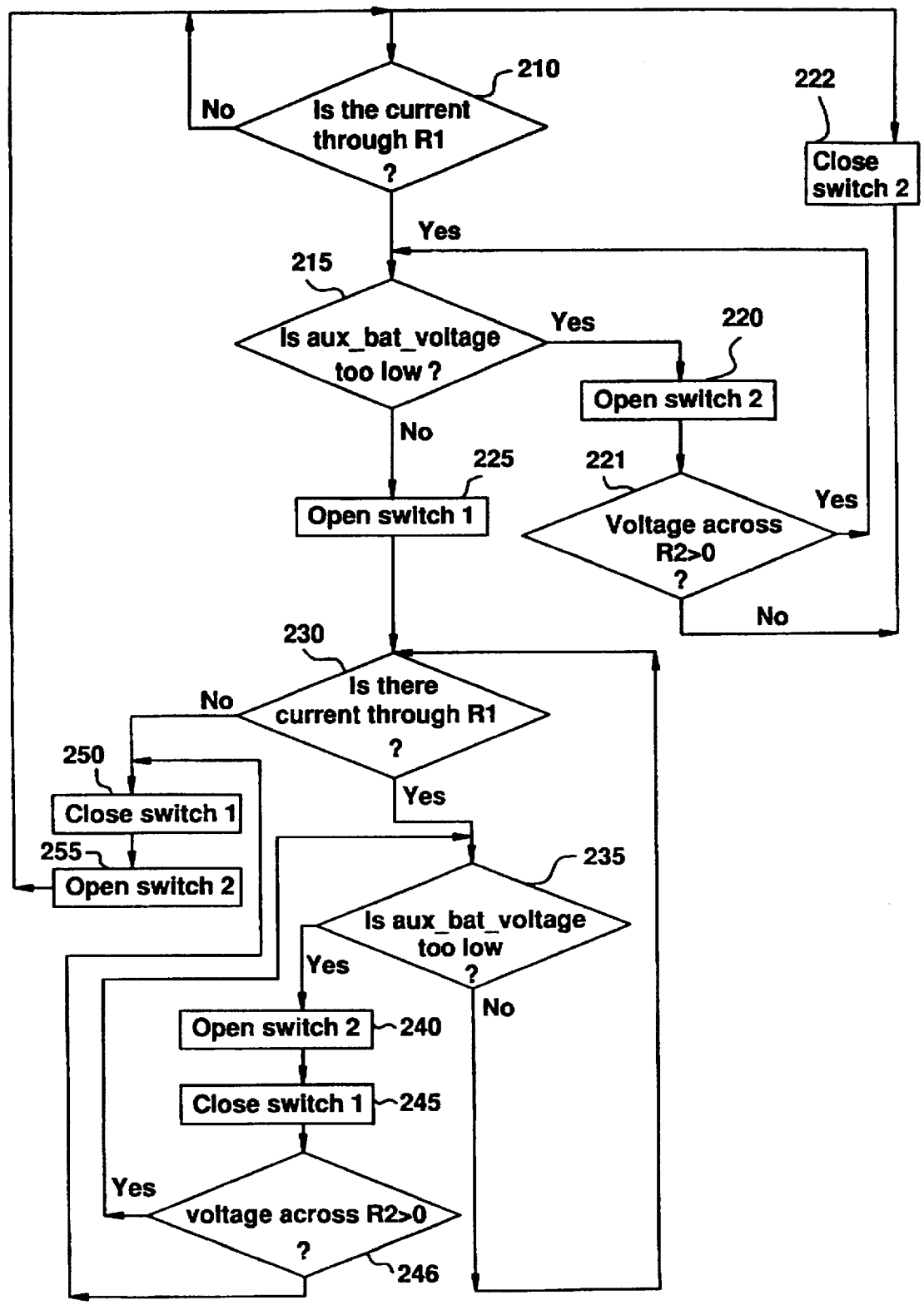
FIG. 5 is a block diagram illustrating the control flow of the microprocessor of FIG. 4.

Referring now to FIG. 5 there is illustrated a flow diagram describing the algorithm for controlling switches 115 and 120 by the microprocessor 125. This algorithm outlines the decision processes followed by the microprocessor 125. Initially, both switches 115 and 120 are closed. Inquiry step 210 determines whether an auxiliary battery 40 has been connected to the cellular telephone unit 10 by measuring current through resistor 150. The microprocessor 125 continues to monitor for connection of the auxiliary battery 40 at step 210 until a connection is detected. Once an auxiliary battery 40 connection is detected, inquiry step 215 determines if the auxiliary battery voltage is too low. When the voltage level is to low, switch 120 is opened at step 220. Inquiry step 221 determines whether the voltage across resistor 200 is greater than zero. As mentioned previously, a voltage across resistor 200 of greater than zero indicates that the auxiliary battery remains connected. If the auxiliary battery 40 is connected, control passes back to step 215 to determine whether or not the battery voltage is too low. If the auxiliary battery 40 is disconnected, switch 120 is closed at step 222 and control passes back to step 210 to monitor for a re-connection of the auxiliary battery.

If sufficient voltage exist within the auxiliary battery 40, switch 115 is opened at step 225. Inquiry step 230 determines whether the auxiliary battery 40 is still connected by sensing current through resistor 200. If the auxiliary battery 40 remains connected, inquiry step 235 determines if sufficient auxiliary battery voltage still remains. As long as the auxiliary battery 40 remains connected and provides sufficient voltage, control continues to loop through inquiry steps 230 and 235 to monitor for auxiliary battery 40 disconnection and low voltages. Should the voltage within the auxiliary battery 40 drop below acceptable levels, switch 120 is opened at step 240 while switch 115 is closed at step 245 to connect the telephone unit 10 to the main battery 25. Once the main battery 25 has been reconnected, inquiry step 246 determines whether the auxiliary battery 40 is still connected by determining whether the voltage across resistor 100 is greater than zero. If so, control passes back to step 235 to determine whether or not the auxiliary battery voltage is still to low. If the auxiliary battery has been disconnected, control passes to steps 250 and 255 to reset switches 120 and 115 to await reconnection of the auxiliary battery 40.

Once the auxiliary battery 40 is disconnected, switch 115 is closed at step 250 while switch 120 is closed at step 255. This passes control of system power to the main battery 25 and control returns back to step 210 to wait for reconnection of the auxiliary battery 40.

Using the circuitry and algorithm described above, the apparatus will operate in the following manner. In normal operation, the auxiliary battery 40 is not connected, and the power source for the telephone unit 10 is the main battery 25. Switch 115 is closed so that the phone draws current from the main battery 25. Switch 120 also remains closed to enable detection of the connection of an auxiliary battery 40. When a user connects the auxiliary battery 40, current passes through the sensor resistor 150 and voltage across resistor 200 becomes greater than zero. This current flow is detected by the current sensor 130 and a current signal notifying the microprocessor 125 is generated.

The voltage sensor 135 and microprocessor 125 then determine if sufficient voltage exists to operate the phone unit 10. If the voltage of the auxiliary battery 40 is too low, the microprocessor 125 keeps switch 115 closed and opens switch 120. This prevents the auxiliary battery 40 from draining current from the main battery 25. If the voltage is sufficient, the microprocessor 125 opens switch 115 to prevent further current drain from the main battery 25.

Switch 115 remains opened and switch 120 closed until such time as the voltage of the auxiliary battery 40 drops below the preselected threshold level, or the telephone unit 10 is disconnected from the auxiliary battery. In either case, switch 115 is closed so that the telephone unit 10 is now powered by the main battery 25. If switch 115 is closed due to low voltage level switch 120 is opened for the reasons discussed above. If the auxiliary battery 40 has been disconnected as indicated by the voltage across resistor 200, switch 120 remains closed to enable detection of current flow to the sensor resistor 150.

The above described circuitry has been described with respect to a cellular telephone unit. However, it should be realized that the circuitry is applicable to other electronic devices requiring increased battery times without an associated increase in device size.

Figure 6:
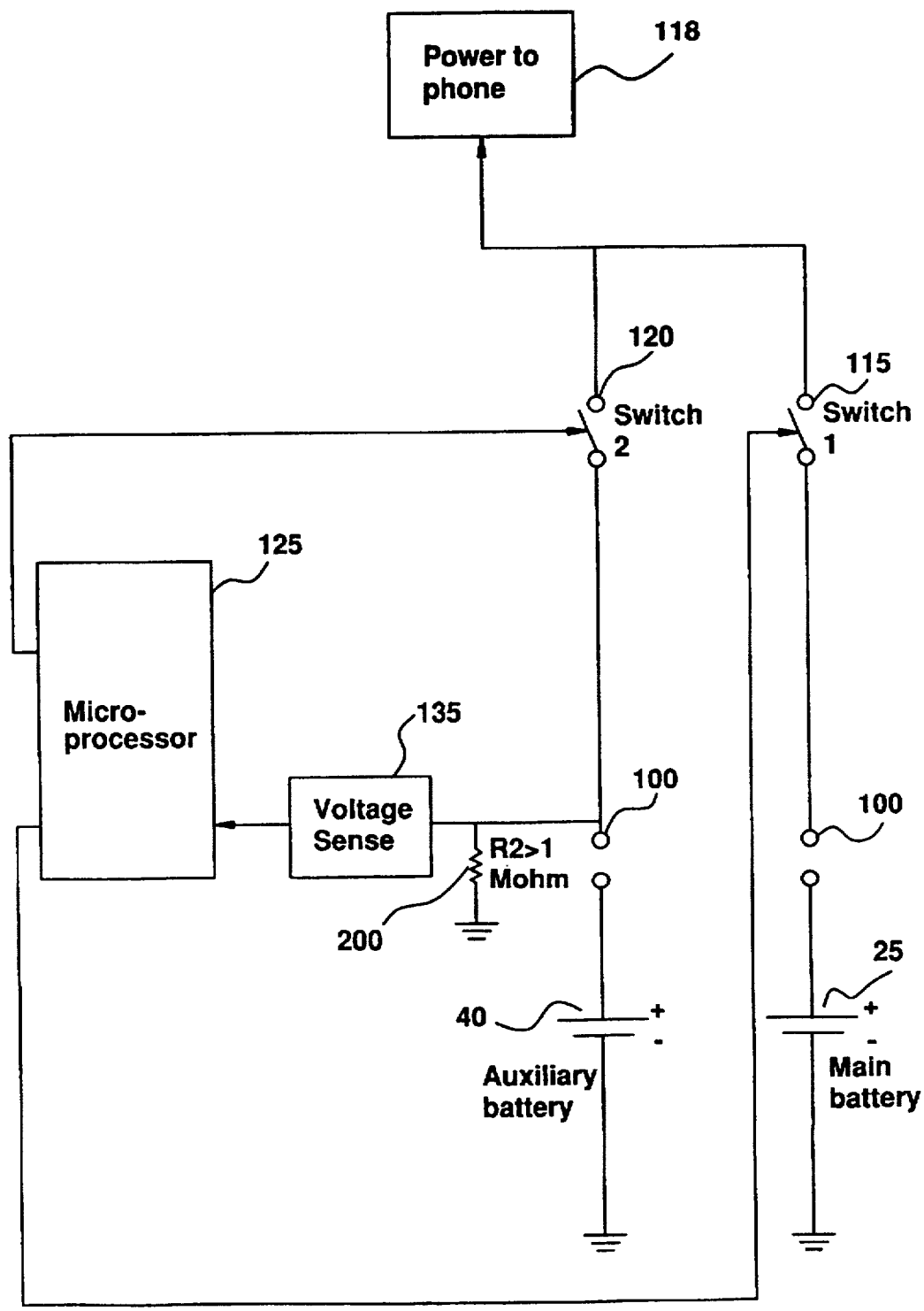
FIG. 6 is an alternative embodiment of the circuitry of FIG. 3 for switching power between the auxiliary battery and the main battery.

Referring now to FIG. 6, there is illustrated an alternative embodiment of the present invention wherein only a voltage sensor 135 monitors for connection of the auxiliary battery 40. Similar reference numerals are used for common parts as those described in FIG. 3. The sensor circuitry 80 includes a pair of connections 100 for interconnecting the main battery 25 and auxiliary battery 40 to the power circuitry 118 of the telephone unit 10. A pair of switches 115 and 120 interconnect the main 25 and auxiliary 40 batteries to the remainder of the telephone power circuitry 118. The switches 120 and 115 are controlled by a microprocessor 125 in response to control signals received from a voltage sensor 135.

The voltage sensor 135 monitors the voltage across a resistor 200. The voltage across resistor 200 changes in response to connection of the auxiliary battery 40 to connector 100 of the sensor circuitry 80. When the auxiliary battery 40 engages connector 100, the voltage across resistor 200 will be positive. Once the auxiliary battery 40 is disconnected, the voltage across resistor 200 goes to zero if switch 120 is open.

The voltage sensor 135 also monitors the voltage output of the connected auxiliary battery 40 and generates a signal indicating whether sufficient voltage exists to power the cellular telephone unit 10. Sufficient voltage is based upon whether the auxiliary battery 40 can supply a preselected threshold voltage. When the auxiliary battery voltage falls below the predetermined threshold, a signal is generated indicating this to the microprocessor 125. The auxiliary battery is then disconnected from the circuit.

Figure 7:
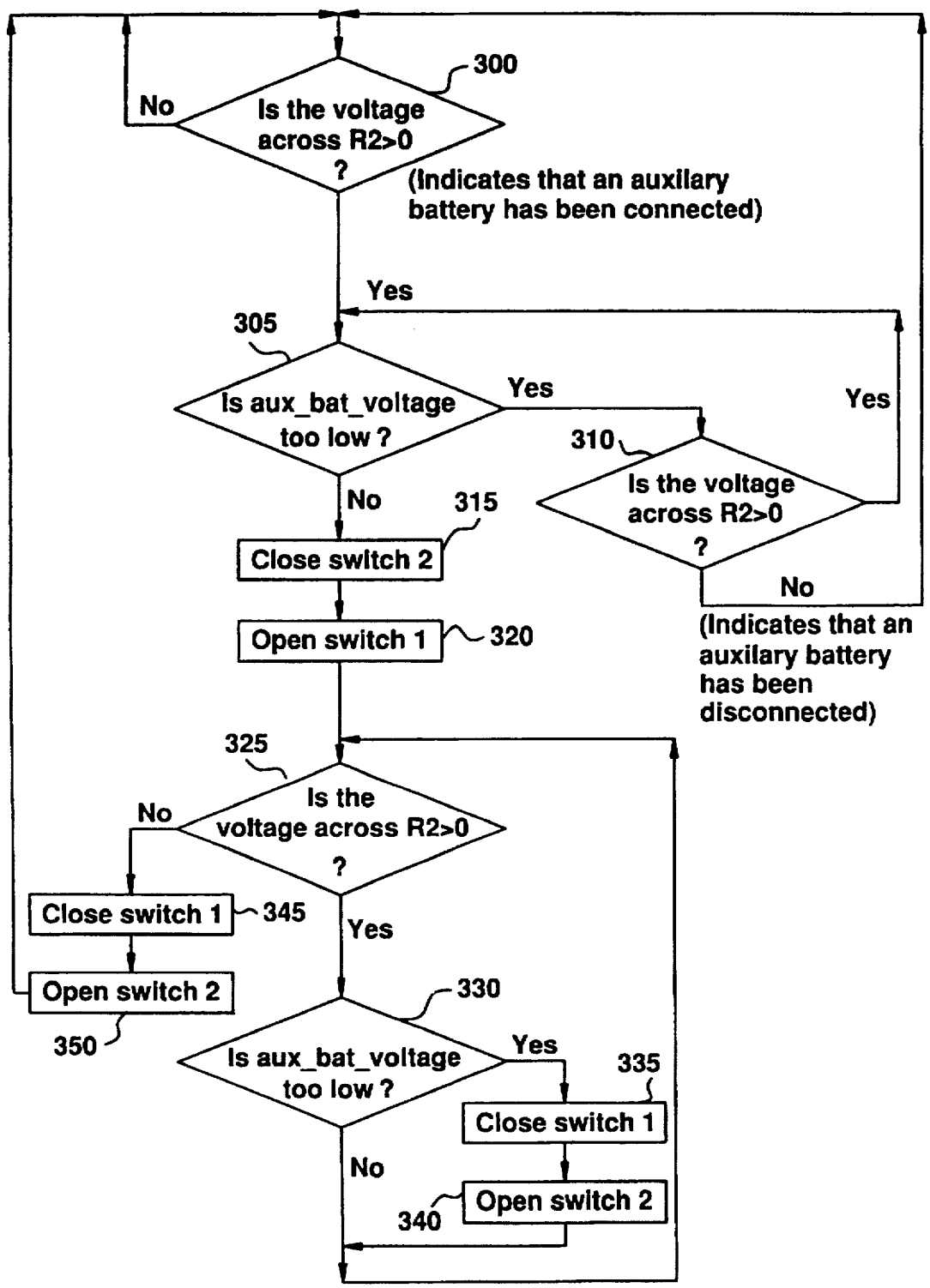
FIG. 7 is a block diagram illustrating the control flow of the microprocessor of FIG. 6.

Referring now to FIG. 7, there is illustrated a flow diagram describing the algorithm for controlling switches 115 and 120 by the microprocessor 125 for the embodiment of FIG. 6. The algorithm outlines the decision processes followed by the microprocessor 125. Initially, switch 115 is closed while switch 120 is opened. This connects the main battery 25 to the telephone power circuitry 118. Inquiry step 300 monitors the voltage across resistor 200 to determine whether or not the voltage is greater than zero. A voltage level of zero indicates that the auxiliary battery 40 has not been connected and control continues to loop through step 300. When connection of the auxiliary battery 40 is detected, inquiry step 305 determines whether the auxiliary battery voltage is too low. If so, control passes to inquiry step 310 to again determine if the voltage across resistor 200 is greater than zero. If so, control continues to return to step 305. Once the voltage across resistor 200 indicates the auxiliary battery 40 has been disconnected, control passes back to step 300.

If inquiry step 305 determines the auxiliary battery voltage is not too low, switch 120 is closed at step 315 and switch 115 is opened at step 320. This disconnects the main battery 25 from the power circuitry 118 and connects the auxiliary battery 40. The voltage sensor 135 continues to monitor for the connection of the auxiliary battery 40 to the power circuitry 118 at inquiry step 325. If the resistor 200 maintains a positive voltage, inquiry step 330 again checks whether the auxiliary battery voltage is too low. If so, switch 115 is closed at step 335 and switch 120 is opened at step 340 to disconnect the auxiliary battery 40 from the power circuitry 118 and control returns to step 325. If the voltage is not too low, the processor 125 merely continues to monitor for continued connection by returning to step 325.

Once inquiry step 325 determines the voltage across resistor 200 is no longer greater than zero, switch 115 is closed at step 345 and switch 120 is opened at step 350 to reconnect the main battery 25. Control then returns to step 300 to monitor for reconnection of an auxiliary battery 40.

Using the circuitry and algorithm discussed above, the alternative embodiment will operate in the following manner. In the normal mode of operation, the auxiliary battery 40 is not connected, and the source of power for the cellular telephone unit 10 is the main battery 25. Thus, in normal operation, switch 115 is closed so that the cellular telephone unit 10 can draw current from the main battery 25. Switch 120 is opened during normal operation. The cellular telephone unit microprocessor 125 continually monitors the voltage sensor 135 to determine the voltage across resistor 200.

When an auxiliary battery 40 is connected, a voltage drop is created across resistor 200 and the voltage of the auxiliary battery 40 can be read through voltage sensor 135. The microprocessor 125 then determines if the auxiliary battery 40 has sufficient voltage to operate the cellular telephone unit 10. If the voltage of the auxiliary battery 40 is too low to operate the cellular telephone unit 10, the microprocessor 125 will do nothing and the phone will continue to be powered by the main battery 25. If the voltage of the auxiliary battery 40 is high enough, the microprocessor 125 will close switch 120, enabling the cellular telephone unit 10 to draw current from the auxiliary battery 40. The cellular telephone unit 10 will then open switch 115 thereby preventing any further current drain from the main battery 25.

The cellular telephone unit 10 will keep switch 115 opened and switch 120 closed until such time as the microprocessor 125 detects either the voltage of the auxiliary battery 40 falling below the minimum threshold level, or that the cellular telephone unit 10 has been disconnected from the auxiliary battery 40. In either case, once this is detected, switch 115 closes so that the telephone can be powered by main battery 25. Switch 120 is opened to facilitate future detection of an auxiliary battery 40 with sufficient voltage to power the telephone.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A cellular telephone belt holder, comprising:

a housing defining a cradle for holding a cellular telephone;

a backup battery connected with the housing for powering the cellular telephone in response to placement of the cellular telephone within the cradle;

means for switching power circuitry of the cellular telephone to the backup battery from a primary battery of the cellular telephone in response to placement of the cellular telephone within the cradle, the means for switching further able to switch the power circuitry of the cellular telephone back to the primary battery upon depletion of the backup battery while the cellular telephone is within the cradle; and a belt clip for attaching the housing to the belt of a user.

2. The holder of claim 1 further including means for removably locking the cellular telephone into the housing.

3. The holder of claim 1 wherein the housing defines an opening for attachment of peripheral devices to the cellular telephone.

* * * * *

UNITED STATES PATENT AND TRADEMARK OFFICE
CERTIFICATE OF CORRRECTION

Page 1 of 2

PATENT NO. : 5,768,371
DATED : June 16, 1998
INVENTOR(S) : Thomas D. Snyder It is certified that error appears in the above-identified patent and that said Letters Patent is hereby corrected as shown below:

At References Cited, please add the following patents and publications

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 5 | 1 | 3 | 6 | 2 | 2 | 9 | 08/04/92 | Galvin | | | |
| | | 5 | 4 | 1 | 4 | 5 | 9 | 6 | 05/09/95 | Eaton, et al. | | | |
| | | | | | | | | | | | | | |

UNITED STATES PATENT AND TRADEMARK OFFICE
CERTIFICATE OF CORRECTION

PATENT NO. : 5,768,311
DATED : June 16, 1998
INVENTOR(S) : Thomas D. Snyder

It is certified that error appears in the above-identified patent and that said Letters Patent is hereby corrected as shown below:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 2 | 2 | 6 | 7 | 0 | 12 | A | 17/11/93 | GB | | | | |
| | | 9 | 4/ | 1 | 1 | 9 | 0 | 9 | 26/05/94 | WO | | | | |
| | | 2 | 7 | 0 | 4 | 9 | 96 | A | 10/11/94 | FR | | | | |
| | | | | | | | | | | | | | | |

Signed and Sealed this

Twenty-third Day of February, 1999

Attest:

Q. TODD DICKINSON

Attesting Officer

Acting Commissioner of Patents and Trademarks